United States Patent
Tschirgi

[15] 3,650,776
[45] Mar. 21, 1972

[54] DEHYDRATED POTATO PRODUCT AND PROCESS FOR PRODUCING SAME

[72] Inventor: Alan W. Tschirgi, P.O. Box 411, Idaho Falls, Idaho

[22] Filed: Apr. 16, 1969

[21] Appl. No.: 816,807

[52] U.S. Cl. ............................99/207, 99/100 P, 99/104, 99/168
[51] Int. Cl. .....................A23b 7/03, A23l 1/12, A23b 7/16
[58] Field of Search ..............99/57, 100, 100 R, 100 P, 103, 99/104, 204–206, 207, 215, 230, 246, 168

[56] References Cited

UNITED STATES PATENTS

| | | | |
|---|---|---|---|
| 2,816,037 | 12/1957 | Olsen et al. | 99/100 X |
| 3,175,914 | 3/1965 | Vahlsing | 99/100 |
| 3,230,094 | 1/1966 | Hilton | 99/207 |
| 3,314,805 | 4/1967 | Templeton | 99/207 X |
| 3,343,970 | 9/1967 | Pader et al. | 99/207 |
| 3,410,702 | 11/1968 | Frank | 99/100 P |
| 3,451,822 | 6/1969 | Fast et al. | 99/100 X |
| 3,489,575 | 1/1970 | Johnson et al. | 99/207 |

OTHER PUBLICATIONS

Publication, Potato Processing, by Talburt & Smith (1967) (pp. 424–427)

*Primary Examiner*—Norman Yudkoff
*Assistant Examiner*—Martin G. Mullen
*Attorney*—Mallinckrodt & Mallinckrodt

[57] ABSTRACT

A process for producing an improved dehydrated potato product especially useful for the preparation of "hash-browns." The process includes the steps of preparing, from dehydrated potatoes and water, a liquid system having phases containing starch, pectins, proteins, and fiber; coating cut pieces of fresh or boiled potato with the liquid system; and dehydrating the coated pieces. The resulting product is conveniently rehydrated by merely adding water, and is then fried as a cohesive mass to yield hash-brown potatoes of desirable texture and golden brown color. A milk product, such as sweet dried whey, can be mixed with the liquid system to improve the browning characteristics upon frying. Flavoring agents and various additives can also be included if desired.

9 Claims, No Drawings

DEHYDRATED POTATO PRODUCT AND PROCESS FOR PRODUCING SAME

BACKGROUND OF THE INVENTION

1. Field

The invention is in the art of dehydrated potato products and of processes for producing such products.

2. State of the Art

The style of fried potatoes commonly called "hash-browns" has long been known and is featured at restaurants and in homes throughout the United States. In general, hash-browns are prepared by cutting peeled fresh or boiled potatoes into narrow, elongated pieces and by frying the massed pieces in the form of large or small patties. The resulting patties have a golden brown color and pleasing texture and flavor.

Numerous attempts have been made to prepare a commercial hash-brown product employing dehydration to provide virtually indefinite storage life and afford the economic savings inherent in handling and transporting a dehydrated product. One of the principal difficulties encountered has been the inability to provide a dehydrated potato product which possesses all of the qualities expected and desired by the consumer public upon rehydration and frying including the degree of browning, texture and true potato flavor. The commercial products prepared heretofore have not been favorably comparable in these important qualities to the hash-browns prepared from fresh potatoes.

SUMMARY OF THE INVENTION

In the practice of the invention, dehydrated potatoes such as dices, slices, or other potato pieces, are comminuted and added to water. The mixture of dehydrated potato pieces and water is then heated above the ambient temperature for a sufficient period of time to permit the gelation of the potato starch in the mixture. As the preparation of the liquid system evolves, the resulting system will carry potato proteins, sugars, fiber and other potato constituents in several phases, e.g., colloidal, sol, suspension and solution. The liquid system is then used to coat fresh potato pieces which have been cut to a predetermined size and shape for hash-brown potatoes. Sufficient liquid system should be added to ensure that all pieces of the potato are enshrouded with the liquid. The coated potato pieces are then dehydrated to provide a dehydrated hash-brown potato product which, when rehydrated and fried, will have the requisite texture, flavor, and color of the hash-brown potatoes prepared directly from fresh or boiled potatoes.

DETAILED DESCRIPTION OF BEST MODE PRESENTLY CONTEMPLATED

In a preferred embodiment, a dried milk product, such as sweet dried whey, is added to the liquid system prior to the coating step. The addition of a dried milk product, which consists principally of caseinate, gives the rehydrated potato when fried a richer golden brown coloration and permits a wider range of browning possibilities according to the personal preference of the consumer. The presence of whey in the liquid system is not noticeable on the dehydrated potato pieces; thus, the natural potato coloring and appearance are retained.

The utilization of dried milk products also obviates the need for control of natural sugars or the addition of other sugars in the processed potatoes. Commonly added sugars, such as dextrose, tend to cause undesirable charring of the fried potatoes if the natural sugar content is not diminished during processing. It has been found that the incorporation of milk products minimizes charring during frying, and therefore removes the necessity for sugar control.

The process as described herein provides a number of unexpected advantages and improvements to the dehydrated hash-brown potato that were not believed to be obtainable heretofore. Hash-brown potatoes prepared according to the process are now virtually indistinguishable from those prepared from fresh potatoes, and in several respects are preferable. The texture, flavor, and cohesiveness of the processed potatoes when fried are measurably improved over the products available in the market.

In the practice of the invention it is possible to add flavor additives, harmonizers, and other agents which may be desirable to enhance the subtle flavor of the fried product, in addition to providing a pleasing and appetite-stimulating aroma. Such additives include salt, pepper, monosodium glutamate, onion, and meat flavorings, such as ham, bacon, or chicken, and many others. The flavoring agents, seasonings, and other related substances are mixed with the liquid system prior to coating the fresh potato pieces with the liquid. The seasoning adheres to the potato pieces with the liquid during the dehydration step and also through subsequent rehydration and frying to provide a flavorful hash-brown potato. Dehydrated hash-browns prepared according to methods presently in use are unable to incorporate the varieties and amounts of flavoring agents which can be added with this process.

The coating of potato pieces with the liquid system enables the pieces to replace any of the potato protein, starch, or cellular materials which may have been lost through the various steps for preparing the fresh potato pieces for dehydration. The potato product is thereby restored to a near natural potato state or greater, and achieves an enhanced potato flavor. It has been found that the coated dehydrated potato pieces can actually be made to gain approximately 10 percent or up to as much as 25 percent by weight in potato constituents through the coating action.

Upon rehydration, the coated potato pieces acquire a volume approximately double that of rehydrated hash-brown potatoes processed according to known methods. Commercially processed dehydrated hash-browns presently available on the market list the volume of the rehydrated product as being 80 one-half cups of hash-browns per 5 lbs. of dehydrated potatoes. Hash-browns prepared according to the present invention yield from 140 to 160 one-half cups per 5 lbs. of dehydrated product. More water is absorbed by the new hash-browns than by the old, and the result is a fluffier hash-brown potato having a volume nearer the natural fresh state than has been attainable with presently-known methods. It is noteworthy that rehydrated weights per unit of ½ cup volume of potatoes processed by this method as compared to other types available are virtually identical, but the increased yield upon rehydration of potatoes processed by this method accounts for the greater total weight and volume.

Fresh potato pieces when fried have a tendency to adhere to each other and therefore make possible a firm potato patty in the hash-brown potato style. This effect is greatly enhanced in the product prepared by the disclosed process, because of the natural tendency of the liquid system to adhere to the individual pieces and, in turn, hold the individual pieces together during the frying process. The exact nature of the cohesive forces involved in adhering the liquid system to the potato pieces is unknown. It is readily recognizable, however, that the liquid adheres to, and coats, the potato pieces tenaciously. The coating remains on the pieces throughout dehydration, subsequent handling, rehydration and frying. It is postulated that the attractive forces between the surface of the potato pieces and the liquid are electrical in nature and possibly define a polarity of electrical forces which create the high degree of cohesion evident in the product.

The size of the individual pieces of potato utilized in the hash-brown potato style commonly ranges from one-half inch to 2 inches or more in length with a cross sectional size of approximately one-eighth inch by three-sixteenth inch. Of course, the disclosed process is not limited to potato pieces of this size. The process can be applied to potato pieces of any size which may be cooked or fried with the resulting desirable characteristics of cohesiveness, flavor, and color found in hash-brown potatoes.

The liquid system itself comprises several phases corresponding to the size and type of particle produced when the comminuted dehydrated potatoes are heated in water. The comminuted potatoes break down into their component parts and form the phases found in the system. For example, the potato starch forms a gel phase which is readily discernable as it forms during the heating of the mixture. Other portions of the potato form phases in the system corresponding to solutions, colloids, sols and mechanical suspensions. Each phase carries a portion of the potato; and all phases constitute the liquid system which adheres to the fresh potato pieces. Although the liquid system as described above is the preferred liquid with which to coat the pieces, beneficial results can be obtained by utilizing a gel formed by heating a mixture of starch and water. Potato starch can be used to maintain the 100 percent potato characteristics of the hash-brown product; however, other types of starch can be employed such as starch from corn, wheat, rice or tapioca.

In practicing the invention, it has been found that any ratio of comminuted dehydrated potato pieces to water may be used, keeping in mind that larger amounts of water dilute the liquid system and provide a thinner coating on the potato pieces. A satisfactory liquid is formed by employing a ratio of approximately one part dehydrated potato to ten parts of water.

The mixture of dehydrated comminuted potatoes and water should be heated until gelation of the potato starch occurs. The preferred temperature at which gelation occurs most readily in a minimum amount of time is approximately 185° to 190° F. The minimum time required under these temperatures is approximately five minutes. Under the requirements of a continuous flow operation, the mixture can be held for longer periods of time at these temperatures, and there is no appreciable change in sugar content or dextrinization.

The coating of the potato pieces by the liquid system is accomplished in any manner sufficient to coat the pieces completely. It has been found that a ratio of one volume of the liquid system to four volumes of potato pieces produces a satisfactory coating.

The coated pieces are dehydrated by known means, such as heating on trays, and can be packaged for distribution. Rehydration and frying are accomplished by adding water to the potato product and permitting the potatoes to absorb water and swell in size. The potato pieces can then be formed into patties, if desired, and fried to a golden brown color with a pleasing texture and flavor.

The following example illustrates the process of the invention, but does not limit the scope of the invention in any way.

EXAMPLE

Water weighting 500 lbs. was mixed with 51 lbs. dehydrated comminuted potatoes and heated to 185° F for 10 minutes, during which time the potato starch present in the mixture gelled forming the potato liquid system. Dried sweet whey (Kraft Foods product tradenamed "Krafen") weighing 39 lbs., 33 lbs. sodium chloride, 3.3 lbs. monosodium glutamate, 2 lbs. onion powder and 4 oz. rosemary were added to the liquid system and thoroughly mixed.

The liquid system containing the seasonings was continuously poured over fresh potato pieces being constantly fed into the top of a loosely packed vessel. The pieces of potato became coated and dropped through an orifice in the bottom of the vessel onto a belt which carried them into a dehydrating apparatus.

Dehydration is effected in customary manner and may be carried to any desired extent, for example from 6 percent to 75 percent moisture content. Preferably the moisture content is reduced to within a range of 6 percent to 35 percent.

I claim:

1. A process for preparing dehydrated hash-brown potato pieces, comprising
   preparing an aqueous suspension of potato constituents by heating a mixture of dehydrated potato pieces and water at a temperature and for a period of time sufficient to disintegrate the potato pieces and form an aqueous suspension thereof;
   coating fresh, peeled potato pieces with the aqueous potato constituent suspension; and
   dehydratrating the coated potato pieces.

2. A process as set forth in claim 1, wherein a dried milk product is admixed with the aqueous potato constituent suspension prior to coating the fresh potato pieces.

3. A process as set forth in claim 2, wherein the milk product is sweet dried whey.

4. A process as set forth in claim 1, wherein at least one seasoning agent is admixed with the aqueous potato constituent suspension.

5. A process as set forth in claim 1, wherein the aqueous potato constituent suspension is prepared by heating the mixture at a temperature of about 180°–195°F.

6. A dehydrated hash-brown potato, comprising a dehydrated potato piece having a dehydrated coating of finely divided potato constituents adhered to the surface thereof, said potato piece and adhered potato constituents having been dehydrated while in contact with each other.

7. A dehydrated hash-brown potato as set forth in claim 6, wherein the coating of potato constituents additionally contains a dried milk product.

8. A dehydrated hash-brown potato as set forth in claim 7, wherein the milk product is sweet dried whey 9. A dehydrated hash-brown potato as set forth in claim 6, wherein the coating contains seasonings.

* * * * *